(No Model.)

I. F. BASSFORD.
LOCKING DEVICE FOR WHEEL HUBS.

No. 597,757. Patented Jan. 25, 1898.

Witnesses.
O. H. Keeney,
Anna V. Faust.

Inventor.
Isaac F. Bassford.
By Benedict & Morsell
Attorneys.

THE NORRIS PETERS CO., PHOTO-LITHO., WASHINGTON, D. C.

United States Patent Office.

ISAAC FRANKLIN BASSFORD, OF MILWAUKEE, WISCONSIN, ASSIGNOR OF ONE-HALF TO CHARLES F. MEYERSIECK, OF ST. LOUIS, MISSOURI.

LOCKING DEVICE FOR WHEEL-HUBS.

SPECIFICATION forming part of Letters Patent No. 597,757, dated January 25, 1898.

Application filed July 26, 1897. Serial No. 645,950. (No model.)

*To all whom it may concern:*

Be it known that I, ISAAC FRANKLIN BASSFORD, of Milwaukee, in the county of Milwaukee and State of Wisconsin, have invented a new and useful Improvement in Locking Devices for Wheel-Hubs and Axle-Boxes, of which the following is a description, reference being had to the accompanying drawings, which are a part of this specification.

My invention has relation to improvements in locking devices for wheel-hubs and axle-boxes.

The primary object is to provide a simple means for locking the vehicle wheel-hub and axle-box against longitudinal disengagement with the axle, the invention dispensing entirely with the necessity of employing a nut on the outer end of the axle and being also of such character that when out of locking engagement with the axle the entire hub and wheel can be removed without the necessity of disassembling any of the parts.

With the above primary object in view the invention consists of the devices and parts, or their equivalents, as will be hereinafter more fully set forth.

Figure 1:
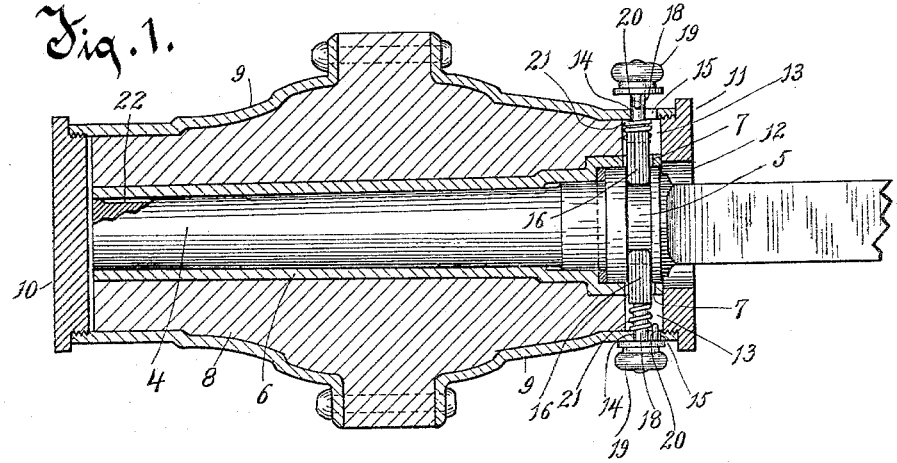
Figure 2:
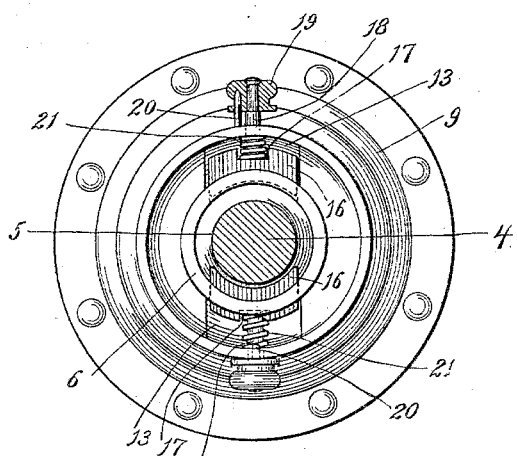
Figure 3:
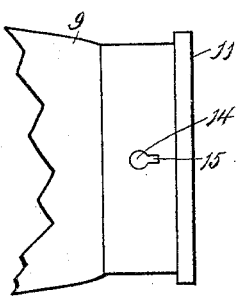

In the accompanying drawings, Figure 1 is a longitudinal sectional view of the invention, showing a part of the axle broken away. Fig. 2 is an end view with a part broken away. Fig. 3 is a fragmentary view of one end of the wheel-hub.

Referring to the drawings, the numeral 4 indicates an axle, which is of the usual and well-known form of construction, excepting that the inner end of the spindle portion thereof is provided with an annular groove 5, formed between two annular shoulders projecting from the spindle.

The numeral 6 indicates an axle-box, and the end thereof which surrounds the annular groove 5 of the axle is provided at diametrically opposite points with elongated slots 7 7.

The numeral 8 indicates the wheel-hub, which has an outer metallic lining 9, said lining projecting at opposite ends beyond the ends of the hub, said projecting portions being provided with interior threads. Fitted to the outer threaded end of the lining is a solid cap 10, and fitted to the inner projecting end of the lining is another cap 11, provided with a central opening 12 for the passage therethrough of the axle.

The hub proper is provided at its inner end at diametrically opposite points with recesses 13 13, which register with the elongated slots 7 of the axle-box. The inner end of the metallic lining 9 is also provided at diametrically opposite points and in alinement with the centers of the recesses 13 with openings 14 14, said openings are provided with branching slots 15 15.

The numerals 16 16 indicate locking-dogs, the inner edges of which are advisably curved to the arc of a circle in order to accurately fit the annular groove 5 of the axle when said dogs are in locking position. The outer edges of the dogs are provided centrally with recesses 17 17, which recesses have extending outwardly therefrom bolts 18 18, said bolts extending through the recesses 13 and through the openings 14 of the lining. The outer extremities of these bolts are fitted with revoluble heads or finger-pieces 19 19 for convenience in operating the bolts. Fitted to the heads and extending inwardly therefrom are pins 20 20. When the bolts are in locking position, these pins are adapted to fit in the branching slots 15, so as to offer no impediment to the dogs engaging the annular groove of the axle. Encircling the bolts between the inner side of the lining and the bottoms of the recesses 17 are coiled springs 21 21.

Figs. 1 and 2 of the drawings show the locking-dogs as engaging the annular groove of the axle. In this position of course the axle-box and the hub of the wheel located thereon are firmly locked to the axle. If now it is desired to disengage the parts for any purpose—as, for instance, for removing the wheel—the heads 19 of the bolts 18 are grasped by the fingers and said bolts pulled outwardly until the inner ends of the pins 20 are beyond the branching slots 15. Inasmuch as the heads 19 of the bolts are revolubly mounted on said bolts, these heads can be readily turned, so that the inner ends of the pins bear against the solid portion of the lining 9, whereby the locking-dogs are held in their adjusted position out of engagement with the annular groove of the axle, the dogs being at this time located in the recesses 13 of the hub and in the elongated slots 7 of the axle-box, the lower edges of the dogs being flush with the inner side of the axle-box, so that no impediment is presented to the free removal of the wheel. When it is again desired to lock the axle-box and the hub carried thereby to the axle, the revoluble heads 19 are again turned until the pins 20 are in line with the branching slots 15. The recoil of the springs 21 will then force the dogs inwardly into engagement with the annular groove of the axle, as clearly shown in the drawings.

From the above description it will be seen that the necessity of a nut on the end of the axle as ordinarily employed for the purpose of securing the axle-box in place is entirely avoided, and consequently when it is desired to remove the wheel the trouble of applying a wrench to the nut for the purpose of removing the same is overcome, and the entire wheel can be removed merely by the simple operation of pulling the locking-dogs outwardly and turning the revoluble heads on the outer ends of the projecting bolts of the locking-dog. In devices where an axle-nut is employed it very frequently happens that said nut accidentally works off the axle, causing the wheel to come off and frequently occasioning serious accidents and runaways.

While I have herein shown and described two of the locking-dogs and allied parts arranged diametrically opposite each other, yet I do not wish to be understood as limiting myself thereto, inasmuch as any desired number of these devices may be employed. One can be used to advantage and even more than two, if desired. I also do not wish to be understood as limiting myself to revoluble heads on the outer ends of the bolts, inasmuch as it is obvious that finger-pieces or heads might be rigidly attached to the outer end of the bolts and said bolts themselves revolubly connected to the locking-dogs. In such case by providing the stationary heads with the projecting pins the same function will be subserved by turning the bolts as by providing stationary bolts and revoluble heads.

While I have described the axle-spindle as provided with the groove 5 for the engagement therewith of the axle-box, yet I do not wish to be understood as limiting myself thereto, inasmuch as the axle or its spindle may be constructed in any desired manner to permit of the engagement therewith of the locking dog or dogs—such, for instance, as merely providing a single annular shoulder arranged to permit the locking-dog to engage against a face thereof.

The peculiar form of hub provided by me also possesses distinguishing features and mechanical advantages in the provision of the projecting interiorly-threaded ends of the lining 9, the outer projecting end adapted to receive the solid cap 10 and the inner projecting end the centrally-apertured cap 11. By this construction the axle-box and hub are adjusted to the axle by passing the end of the axle through the opening of the inner cap 11, the final position of the axle-box being such that the outer end of the axle is in close proximity to the inner side of the solid cap 10.

It will be noticed from Fig. 1 of the drawings that I have shown the axle provided with a longitudinal recess 22. This is for the purpose of receiving an oil lubricant, which can be conveniently poured into the recess when the axle-box and hub are removed from the axle.

What I claim as my invention is—

1. The combination, of an axle, a wheel-hub mounted on the axle and provided with a recess, said recess having an opening leading thereto, said opening having a branching slot extending therefrom, and a locking-dog within the recess of the hub, said dog formed or provided with a projecting bolt extending outwardly through the recess and opening of the hub, said bolt carrying an inwardly-extending pin which is rotatable with or on the bolt, so as to be capable of being turned into or out of register with the branching slot, and said bolt being adapted to be thrust inwardly and outwardly so as to force the locking-dog into or out of engagement with the axle.

2. The combination, of an axle, a wheel-hub mounted on the axle and provided with a recess, said recess having an opening leading thereto which opening has a branching slot extending therefrom, a locking-dog within the recess of the hub, said dog formed or provided with a projecting bolt extending outwardly through the recess and opening of the hub, and a revoluble head on the end of the bolt, said head provided with an inwardly-extending pin, adapted, when the head is turned, to be brought into or out of register with the branch slot to adapt the bolt to be thrust inwardly and outwardly, so as to force the locking-dog into or out of engagement with the axle.

3. The combination, of an axle, a wheel-hub mounted on the axle and provided with a recess having an opening leading thereto, said opening having a branching slot extending therefrom, a locking-dog within the recess of the hub, said dog formed or provided with a projecting bolt extending outwardly through the recess and opening of the hub, said bolt carrying an inwardly-extending pin which is rotatable with or on the bolt so as to be turned into or out of register with the branch slot to adapt the bolt to be thrust inwardly and outwardly so as to force the locking-dog into and out of engagement with the axle, and a coiled spring encircling the bolt within the recess of the hub, and adapted to bear against the dog to normally hold said dog in engagement with the axle.

4. The combination, of an axle-box, a wheel-hub surrounding the box, and an outer lining for the hub provided with projecting threaded ends, a solid cap engaging the threads of the outer projecting end of the lining, a centrally-apertured cap engaging the threads of the inner projecting end of the lining, an axle extending through the apertured cap and into the axle-box, and means for locking said axle in place within the box.

In testimony whereof I affix my signature in presence of two witnesses.

ISAAC FRANKLIN BASSFORD.

Witnesses:
 ADA PRICE,
 JOHN MUIR.